(12) United States Patent
Maslov et al.

(10) Patent No.: US 6,911,794 B2
(45) Date of Patent: Jun. 28, 2005

(54) PRECISION ADAPTIVE MOTOR CONTROL IN CRUISE CONTROL SYSTEM HAVING VARIOUS MOTOR CONTROL SCHEMES

(75) Inventors: Boris A. Maslov, Reston, VA (US); Guohui Yuan, Greenbelt, MD (US)

(73) Assignee: Wavecrest Laboratories, LLC, Dulles, VA (US)

( * ) Notice: Subject to any disclaimer, the term of this patent is extended or adjusted under 35 U.S.C. 154(b) by 0 days.

(21) Appl. No.: 10/431,430

(22) Filed: May 8, 2003

(65) Prior Publication Data

US 2004/0222762 A1 Nov. 11, 2004

(51) Int. Cl.$^7$ .............................................. H02K 37/00
(52) U.S. Cl. ........................ 318/437; 318/434; 318/599
(58) Field of Search ................................. 318/138, 139, 318/254, 439, 434, 721, 722, 729; 702/145, 151; 180/443; 701/41, 42

(56) References Cited

U.S. PATENT DOCUMENTS

| | | | | |
|---|---|---|---|---|
| 4,818,908 A | * | 4/1989 | Tamae et al. ................ | 310/171 |
| 5,757,152 A | * | 5/1998 | Yuem .......................... | 318/254 |
| 5,777,447 A | * | 7/1998 | Okano ......................... | 318/434 |
| 6,002,234 A | * | 12/1999 | Ohm et al. .................. | 318/729 |
| 6,373,211 B1 | * | 4/2002 | Henry et al. ................ | 318/432 |
| 6,549,871 B1 | * | 4/2003 | Mir et al. .................... | 702/145 |
| 6,605,912 B1 | * | 8/2003 | Bharadwaj et al. ......... | 318/439 |
| 6,694,287 B2 | * | 2/2004 | Mir et al. .................... | 702/183 |
| 2001/0005121 A1 | * | 6/2001 | Sakamaki .................... | 318/727 |
| 2003/0046028 A1 | * | 3/2003 | Mir et al. .................... | 702/183 |
| 2003/0062868 A1 | * | 4/2003 | Mir et al. .................... | 318/599 |
| 2003/0200018 A1 | * | 10/2003 | Arimura ...................... | 701/41 |

* cited by examiner

*Primary Examiner*—Paul Ip
(74) *Attorney, Agent, or Firm*—McDermott Will & Emery LLP (57) ABSTRACT

A novel cruise control system is provided for adaptively controlling an electric vehicle to maintain desired speed under variable driving conditions. This system utilizes multiple motor control scheme for controlling the motor using various waveform profiles of the control current, and involves phase advance angle adjustment provided for adaptively controlling a phase advance angle between the control current and back-EMF in response to changes in driving conditions to produce the control current sufficient to achieve the desired speed. A motor control scheme selection circuit enables the cruise control system to select a current waveform profile appropriate for present driving conditions. A selected current waveform profile is modified, if the control current with the adjusted phase advance angle is not sufficient to achieve the desired speed.

28 Claims, 4 Drawing Sheets

PRECISION ADAPTIVE MOTOR CONTROL IN CRUISE CONTROL SYSTEM HAVING VARIOUS MOTOR CONTROL SCHEMES

RELATED APPLICATIONS

This application contains subject matter related to U.S. application Ser. No. 09/826,423 of Maslov et al., filed Apr. 5, 2001, now U.S. Pat. No. 6,492,756; U.S. application Ser. No. 09/826,422 of Maslov et al., filed Apr. 5, 2001, U.S. application Ser. No. 09/966,102, of Maslov et al., filed Oct. 1, 2001, U.S. application Ser. No. 09/993,596 of Pyntikov et al., filed Nov. 27, 2001, U.S. application Ser. No. 10/173,610 of Maslov et al., filed Jun. 19, 2002, now U.S. Pat. No. 6,727,668; U.S. application Ser. No. 10/353,067 of Maslov et al., filed Jan. 29, 2003, and U.S. application Ser. No. 10/386,599 of Maslov et al., filed Mar. 13, 2003, all commonly assigned with the present application. The disclosures of these applications are incorporated by reference herein.

FIELD OF THE INVENTION

The present invention relates to electric vehicles, and more particularly to adaptive cruise control system utilizing phase advance angle adjustment and selection of control current waveform profiles for adaptively controlling the electric motor of a vehicle.

BACKGROUND

A cruise control system in a vehicle provides automatic speed control to enable the vehicle to maintain constant speed under variable driving conditions without driver's intervention. A conventional cruise control system in an electric vehicle controls an electric motor of the vehicle to request a torque value required to achieve a desired speed.

Under typical driving conditions, torque values required to achieve a desired speed are subject to wide variability with little, if any, long term predictability. Moreover, driving conditions, such as steep uphill grade or heavy vehicle load or the like, may impose limitations on available speed and acceleration.

Higher acceleration or greater speed may be required than the system can accommodate at maximum torque restricted by available motor power supply. In particular, the voltage signal that the motor control needs to produce in order to request the torque required to achieve the desired speed may be greater that the supply voltage. Therefore, the motor would not be able to develop the required torque.

In addition, in a vehicle drive environment, wherein power availability is limited to an on-board supply, it is highly desirable to attain a high torque output capability at minimum power consumption. Motor structural arrangements described in the copending applications contribute to these objectives. As described in those applications, electromagnet core segments may be configured as isolated magnetically permeable structures in an annular ring to provide increased flux concentration. Isolation of the electromagnet core segments permits individual concentration of flux in the magnetic cores, with a minimum of flux loss or deleterious transformer interference effects occurring from interaction with other electromagnet members.

The above-identified co-pending application Ser. No. 10/173,610 describes a control system for a multiphase motor that compensates for variations in individual phase circuit elements. A high degree of precision controllability is obtained with each phase control loop closely matched with its corresponding winding and structure. Successive switched energization of each phase winding is governed by a controller that generates signals in accordance with parameters associated with the respective stator phase components. The phase windings are energized with current of sinusoidal waveform for high efficiency operation. The control system varies the output current to respond to, and accurately track, the torque command input.

The sinusoidal current waveform profile obtained with this commutation strategy can extend battery life through efficient operation. However, in vehicle driving operation there may be a need for torque capability in excess of that available from the most efficient control scheme. Typically, the power supply is rated for a maximum current discharge rate, for example, 10.0 amps. If the cruise control system requests a torque command that correlates to this maximum current draw, then the motor torque output for a sinusoidal current waveform profile is limited, for example, to approximately 54.0 Nm in a motor with a configuration such as described above.

The above-identified copending application Ser. No. 10/386,599 describes a cruise control system including a control circuit for producing a control signal to control an electric motor of the vehicle. The control signal is formed based on a control current required to achieve the desired speed. The system determines a motor control scheme that provides an appropriate waveform profile of the control current for available driving conditions. In particular, the system performs switching between a high-efficiency motor control scheme that provides a substantially sinusoidal waveform profile of the control current for achieving operating efficiency of the motor, and a high-torque motor control scheme that provides a substantially rectangular waveform profile of the control current for achieving high torque. The replacement of the high-efficiency control scheme with the high-torque control scheme results in a higher torque needed when torque obtainable with the high-efficiency control scheme is not sufficient for the cruise control system to maintain a desired speed. However, the motor operating at the high-torque control scheme sacrifices some of the efficiency achievable with the sinusoidal waveform profile.

Accordingly, it would be desirable to maintain operations with a substantially sinusoidal waveform profile as long as the required torque is achievable using a high-efficiency control scheme.

Hence, the need exists for precision adaptive motor control that would extend a range of motor operation at a high-efficiency motor control scheme in a cruise control system having various motor control schemes.

DISCLOSURE OF THE INVENTION

The present invention fulfills this need by providing a novel cruise control system for adaptively controlling an electric vehicle to maintain desired speed under variable driving conditions. This system comprises a control signal generating circuit that produces a control signal to energize an electric motor of the vehicle based on control current required to achieve the desired speed. A phase advance angle adjustment circuit is provided for adaptively controlling a phase advance angle between the control current and back-EMF in response to changes in driving conditions to produce the control current sufficient to achieve the desired speed.

In accordance with one aspect of the invention, the cruise control system utilizes multiple motor control schemes for controlling the motor using various waveform profiles of the control current. A motor control scheme selection circuit enables the cruise control system to select a current waveform profile appropriate for present driving conditions. The motor control scheme may adaptively modify a present current waveform profile, if the control current with the adjusted phase advance angle is not sufficient to achieve the desired speed.

For example, the cruise control system may utilize a high-efficiency motor control scheme with a substantially sinusoidal current waveform profile to provide efficient motor operation, and a high-torque motor control scheme with a substantially rectangular waveform profile to provide higher torque required to maintain a desired speed. The phase advance angle adjustment circuit enables the cruise control circuit to maintain the high-efficiency motor control scheme as long as the phase advance angle can be adjusted to provide torque sufficient to maintain a desired speed.

If the cruise control system determines that a change in driving conditions makes it impossible to maintain a desired speed at the high-efficiency motor control scheme even with the adjusted phase advance angle, the motor control scheme selection circuit selects a high-torque motor control scheme to modify a substantially sinusoidal current waveform profile into a substantially rectangular current waveform profile in order to increase torque.

Hence, phase advance angle adjustment enables the cruise control system to provide precision adaptive motor control for maintaining efficient motor operation as long as driving conditions allow the system to maintain a desired speed at a high-efficiency motor control scheme.

In accordance with an embodiment of the present invention, the motor may be a multiphase permanent magnet motor having a stator with a plurality of phase windings. The control signal is provided to energize each phase winding of the motor. The phase advance angle adjustment circuit may set the phase advance angle for each phase of the motor.

In accordance with another aspect of the invention, the phase advance angle may be optimized to maximize torque value and minimize motor phase current for the actual speed of the vehicle and torque required to achieve the desired speed.

The phase advance angle adjustment circuit may comprise a look-up table responsive to actual speed of the vehicle and torque required to achieve the desired speed, for outputting the control current with the adjusted phase angle. The look-up table may be configured to output the control current with the modified waveform profile, if the current with the adjusted phase advance angle is not sufficient to achieve the desired speed.

In accordance with a method of the present invention, the following steps are carried out to adaptively control an electric vehicle to maintain desired speed under variable driving conditions:
producing a control signal to energize an electric motor of the vehicle, based on control current required to achieve the desired speed, and
adaptively controlling a phase advance angle between the control current and back-EMF to produce the control current sufficient to achieve the desired speed.

The method may further involve the step of adaptively modifying waveform profile of the control current if the control current with the adjusted phase advance angle is not sufficient to achieve the desired speed.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
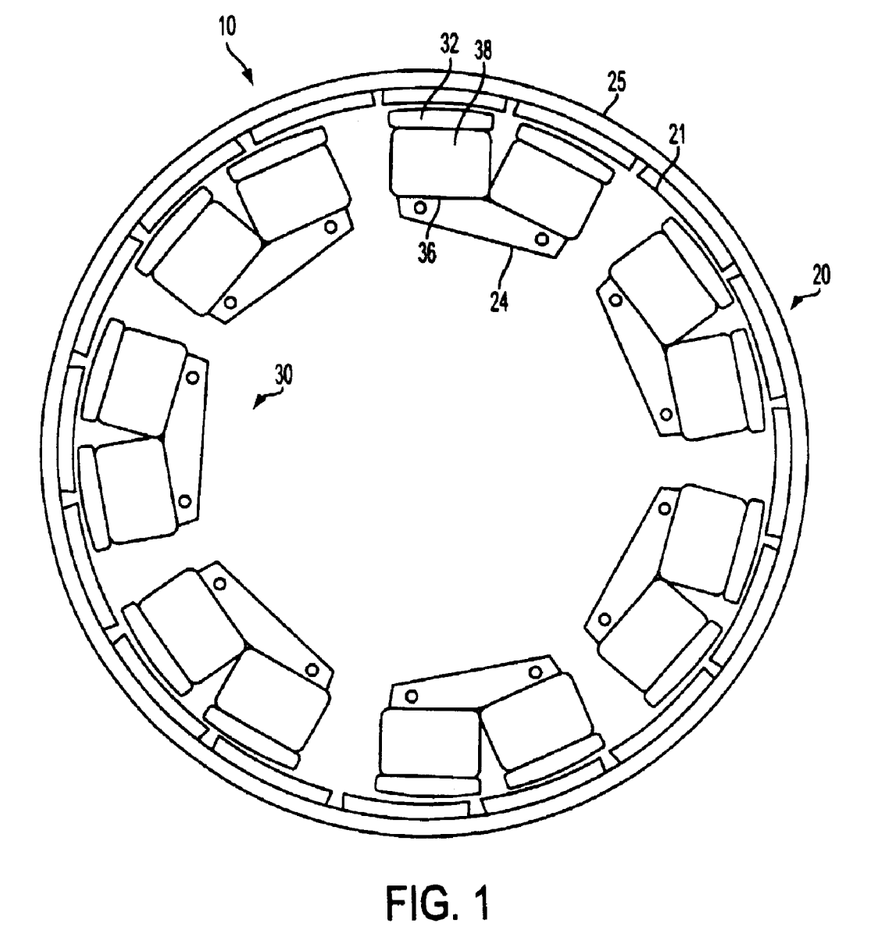
FIG. 1 is an exemplary view showing rotor and stator elements in a configuration that may be employed in the present invention.

The present invention is applicable to a vehicle driven by an electric motor such as disclosed in the copending application Ser. No. 09/826,422, although the invention can be used with various other permanent magnet motors. FIG. 1 thus is an exemplary view showing rotor and stator elements of a motor 10 as described in that application, the disclosure of which has been incorporated herein. Rotor member 20 is an annular ring structure having permanent magnets 21 substantially evenly distributed along cylindrical back plate 25.

The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap. Each core segment comprises a generally U-shaped magnetic structure 36 that forms two poles having surfaces 32 facing the air gap. The legs of the pole pairs are wound with windings 38, although the core segment may be constructed to accommodate a single winding formed on a portion linking the pole pair.

Each stator electromagnet core structure is separate, and magnetically isolated, from adjacent stator core elements. The stator elements 36 are secured to a non-magnetically permeable support structure, thereby forming an annular ring configuration. This configuration eliminates emanation of stray transformer flux effects from adjacent stator pole groups. The stator electromagnets are thus autonomous units comprising respective stator phases.

The concepts of the invention, more fully described below, are also applicable to other permanent magnet motor structures, including a unitary stator core that supports all of the phase windings.

Figure 2:
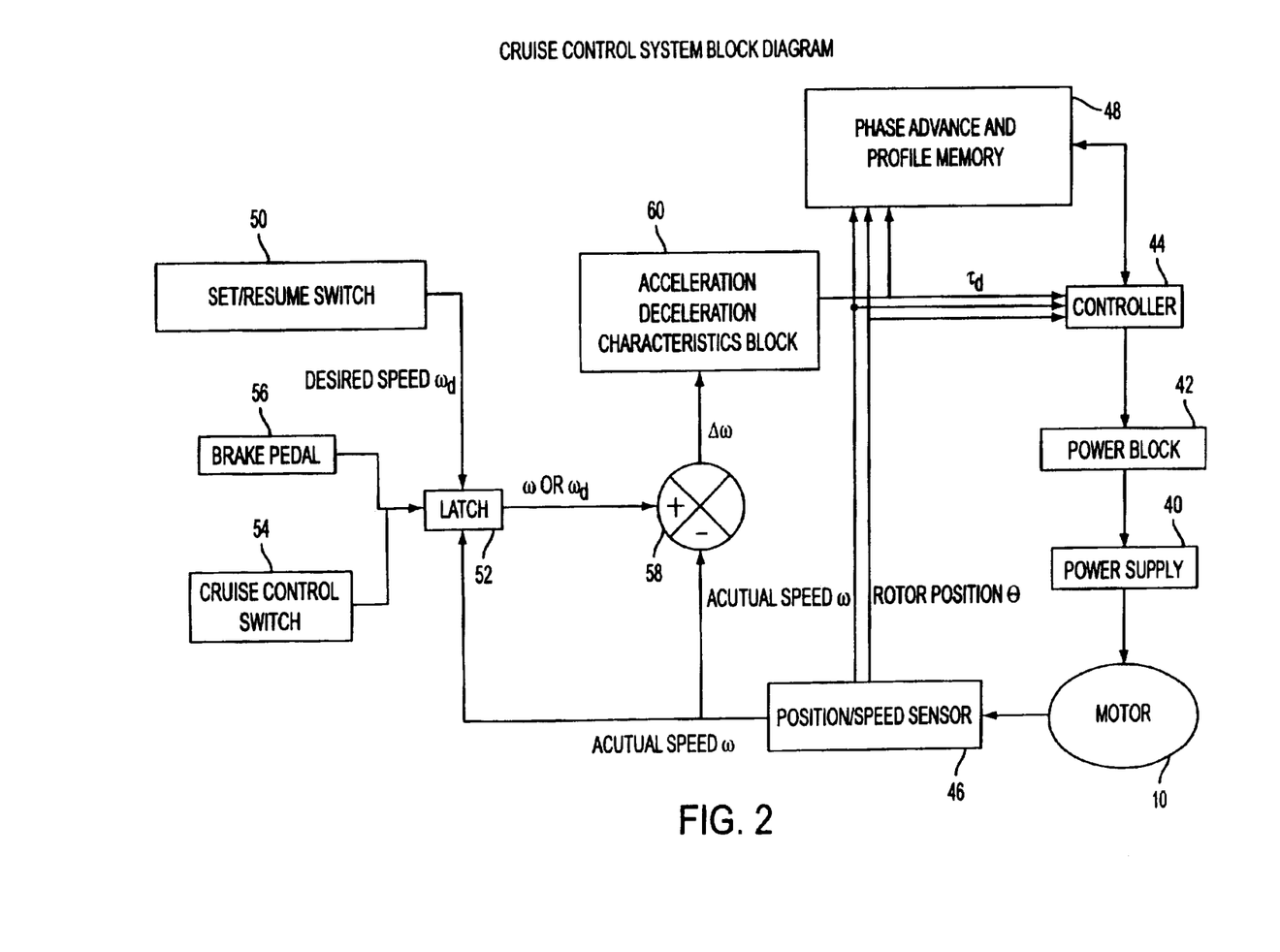
FIG. 2 is a block diagram of an adaptive cruise control system in accordance with the present invention.

FIG. 2 is a block diagram of an adaptive cruise control system in accordance with the present invention. A plurality of stator phase windings 38 of the multiphase motor 10 (shown in FIG. 1) are switchably energized by driving current supplied from d-c power source 40 via power block 42. The power block 42 may comprise electronic switch sets that are coupled to controller 44 via a pulse width modulation converter and gate drivers. Each phase winding is connected to a switching bridge having control terminals connected to receive pulse modulated output voltages from the controller. Alternatively, the switching bridges and gate driver components may be replaced by amplifiers linked to the controller output voltages. Rotor position and speed sensor 46 provides rotor position and speed feedback signals to the controller 44. The sensor 46 may comprise a well-known resolver, encoder or their equivalents and a speed approximator that converts the position signals to speed signals in a well-known manner.

The controller 44 may comprise a microprocessor or equivalent microcontroller, such as Texas Instrument digital signal processor TMS320LF2407APG. Coupled to the controller may be RAM and ROM memories for storing programs and data used in the controller's operation.

Phase advance and profile memory 48 is shown separately in the drawing for purposes of illustration of the inventive concepts. The phase advance and profile memory 48 may comprise a look-up table for storing phase advance and motor control scheme data that determine phase advance angle and motor current waveform profiles selectable in accordance with driving conditions.

The phase advance angle and motor control schemes stored in the profile memory 48 are selected based on a torque command $\tau_d$, actual speed $\omega$ of the vehicle and rotor position $\theta$ that may be determined by the position/speed sensor 46. The torque command $\tau_d$ determines torque required to achieve the desired speed $\omega_d$ maintained by the cruise control system.

In a well known manner, the desired speed is defined by set/resume switch 50 that sets the desired speed in the cruse control system, or commands the system to resume the desired speed set previously. The desired speed value is supplied to latch 52 that monitors cruise control switch 54 to determine whether a cruise control mode is set, and monitors brake pedal 54 to determine whether the cruise control mode is released. Subtracting unit 58 determines the difference $\Delta\omega$ between the actual speed and the desired speed. Based on this difference, acceleration/deceleration characteristics unit 60 determines the torque command $\tau_d$ required to achieve the desired speed. The acceleration/deceleration characteristics unit 60 calculates torque using a well-known algorithm for determining torque for particular acceleration and deceleration characteristics.

In order to develop the desired phase currents, the controller 44 of the cruise control system generates the following control voltage:

$$V_i(t) = L_i dI_{di}/dt + R_i I_i + E_i + k_{si} e_i$$

where $V_i(t)$ is the voltage across the phase winding;
$I_{di}(t)$ is the desired phase current to be produced to obtain torque required to achieve the desired speed $\omega_d$;
$I_i(t)$ is the phase current;
$R_i$ is the winding resistance;
$E_i(t)$ is the back-EMF;
$L_i$ is the winding self-inductance;
$k_{si}$ is the current loop feedback gain; and
$e_i$ is the phase current error.

The methodology by which the controller 44 derives the components of this voltage control expression is described in more detail in copending application Ser. No. 10/386,599 entitled "ELECTRIC VEHICLE WITH ADAPTIVE CRUISE CONTROL SYSTEM" and in copending application Ser. No. 10/353,067 entitled "PHASE ADVANCE ANGLE OPTIMIZATION FOR BRUSHLESS MOTOR CONTROL" both incorporated herein by reference. The desired phase current $I_{di}$ required to obtain torque needed to achieve the desired speed is provided by the phase advance and profile memory 48 in accordance with a phase advance angle and a motor control scheme selected by the cruise control system.

The desired phase current $I_{di}(t)$ defines a control scheme which determines a manner in which the cruise control system responds to the torque command requested by the system to achieve the desired speed. Each control scheme effects a particular motor current waveform profile having unique characteristics with respect to efficiency, torque capacity, response capability, power losses, etc., in comparison to other control schemes. In particular, substantially sinusoidal waveform profile of the desired phase current $I_{di}(t)$ defines a high-efficiency control scheme that enables the motor to achieve high operating efficiency.

A significant aspect of the present invention is provision of phase advance angle optimization in a cruise control system having a plurality of available motor control schemes adaptively selected to obtain a desired response. For example, the introduction of the phase advance angle adjustment enables the motor to achieve higher torque at a high-efficiency control scheme using substantially sinusoidal waveform profile of desired phase current $I_{di}$. As a result, a range of motor operation at the high-efficiency control scheme may be extended.

Figure 3:
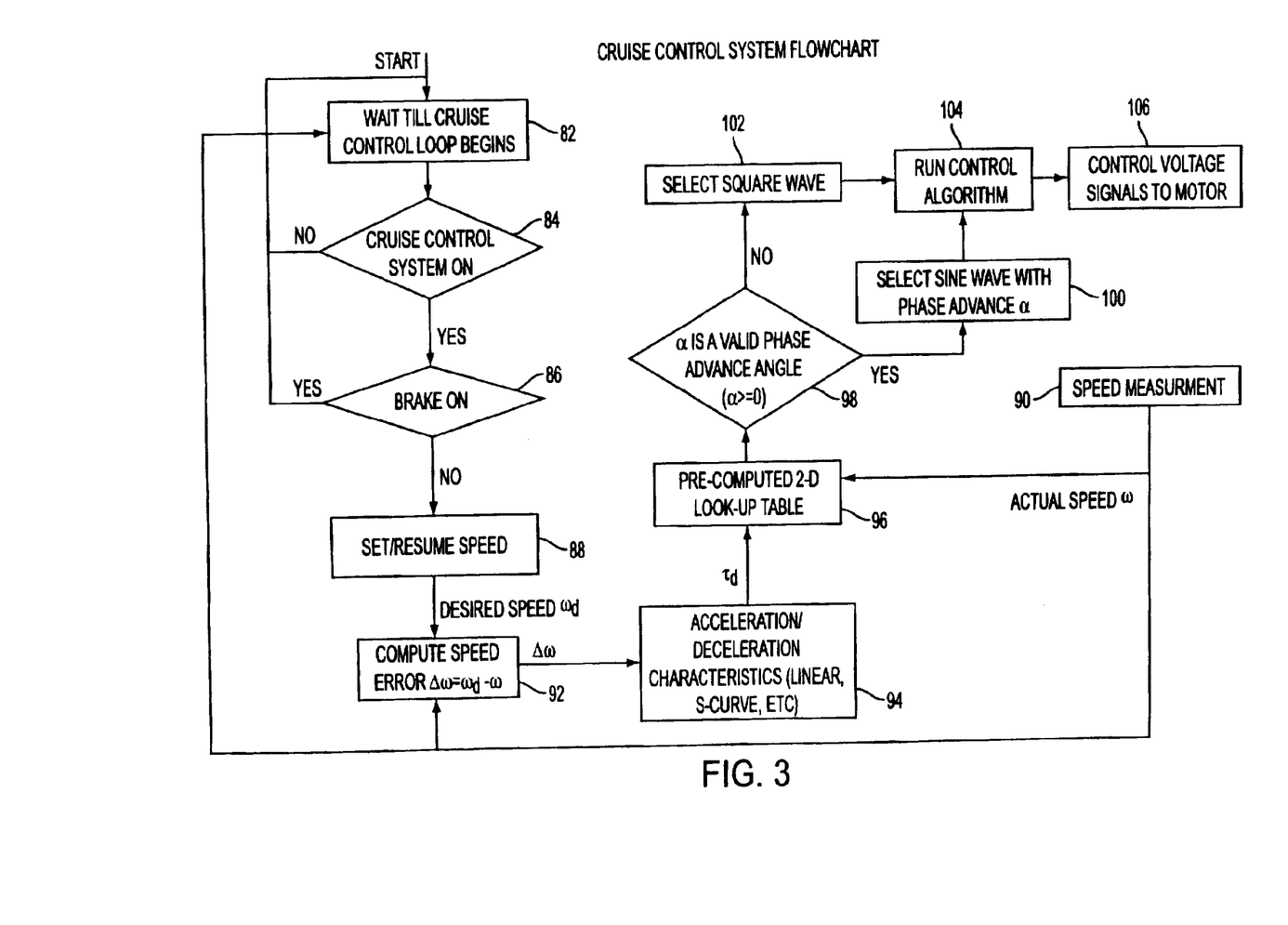
FIG. 3 is a flow chart illustrating operations of the adaptive cruise control system in accordance with the present invention.

FIG. 3 is a flow chart illustrating operation of the adaptive cruise control system of the present invention. After an appropriate delay to wait until a cruise control loop begins (step 82), the cruise control system checks whether or not the switch for engaging cruise control operation is in ON state (step 84). If so, the cruise control system checks whether the brake pedal 56 was pressed after engaging the cruise control operation (step 86). If so, the cruise control operation is terminated. However, if the brake pedal was not pressed, the system determines the desired speed $\omega_d$ to be maintained (step 88). The desired speed is defined in a well know manner by set/resume switch 50 that sets the desired speed in the cruse control system, or commands the system to resume the desired speed set previously.

The actual speed $\omega$ measured in a well-known manner (step 90) is compared with the desired speed $\omega_d$ to calculate the speed error $\Delta\omega$ as the difference between the actual speed and the desired speed (step 92). The torque command $\tau_d$ that defines torque required to achieve the desired speed $\omega_d$ is determined based on the speed error and a desired acceleration/deceleration characteristics (step 94). For example, the torque command may be determined for linear or S-curve acceleration/deceleration characteristics based on well-known algorithms.

In step 96, the torque command, actual speed and rotor position are input to a pre-computed 2-D look-up table containing phase advance and motor control scheme data in the phase advance and profile memory 48. The look-up table stores motor control scheme data for supporting various modes of operation manifesting different operational aspects. For example, the cruise control system may operate using a high-efficiency motor control scheme utilized to energize the phase windings with current of sinusoidal waveform trajectory $I_{sin}(t)$ for high efficiency operation. The sinusoidal current waveform profile obtained with this motor control scheme can extend battery life.

Other control schemes may be utilized to manifest particular operational aspects of the cruise control system. For example, for higher torque operation, a high-torque motor control scheme may be utilized to obtain a square wave current waveform trajectory $I_{sq}(t)$ of the desired phase current $I_{di}(t)$ supplied to the controller 44.

The replacement of the high-efficiency control scheme with the high-torque control scheme results in a higher torque needed when torque obtainable with the high-efficiency control scheme is not sufficient for the cruise control system to maintain a desired speed. However, the motor operating at the high-torque control scheme sacrifices some of the efficiency achievable with the sinusoidal waveform profile.

Accordingly, it would be desirable to maintain operations with a substantially sinusoidal waveform profile of the phase current $I_{di}$ as long as the required torque is achievable using the high-efficiency control scheme. The cruise control system of the present invention utilizes the phase advance technique to achieve an extended range of operation with current of sinusoidal waveform trajectory $I_{sin}(t)$ for achieving higher efficiency. The extended range is provided by controlling the phase advance angle α between the current vector and the back-EMF vector.

For achieving a higher torque using the phase advance technique, the per-phase desired current trajectories are selected according to the following expression:

$$I_{di}(t) = I_{opti} \sin(N_r \theta_i + \alpha_{opti}),$$

where $I_{di}$ denotes per-phase desired current trajectory, $I_{opti}$ is per-phase optimal current amplitude, $N_r$ is the number of permanent magnet pole pairs, $\theta_i$ represents relative positional displacement between the $i^{th}$ phase winding and a rotor reference point, and $\alpha_{opti}$ is per-phase optimal phase advance angle.

An optimization scheme such as described in the copending application Ser. No. 10/353,067 entitled "PHASE ADVANCE ANGLE OPTIMIZATION FOR BRUSHLESS MOTOR CONTROL" may be used to determine per-phase optimal phase advance angle $\alpha_{opti}$ and per-phase optimal phase current amplitude $I_{opti}$ utilized to determine per-phase current $I_{di}(t)$ required to enable the motor to develop a torque needed to maintain a desired speed. The per-phase optimal phase advance angle $\alpha_{opti}$ and per-phase optimal phase current amplitude $I_{opti}$ are set to obtain a maximum torque value for actual speed of the vehicle, and to minimize motor phase current for the actual speed of the vehicle and torque required to achieve the desired speed.

The 2-D look-up table in the phase advance and profile memory 48 responsive to the motor speed and user requested torque command inputs provides the optimal values of phase current amplitude and phase advance angle for various combinations of torque command $\tau_d$ and actual speed ω. Since the optimal values of phase current amplitude and phase advance angle are determined based on phase dependent parameters such as reactance of phase windings, torque coefficient and back-EMF, the optimization processes are performed for each phase to determine control signals $V_i(t)$ for respective phase windings. As a result, the phase advance angle optimization process of the present invention accounts for the parameter variations in the separate phase windings and stator phase component structures.

Further, the look-up table in the phase advance and profile memory 48 stores motor control scheme data formulated to enable selection between different motor control schemes for various combinations of torque command $\tau_d$ and actual speed ω. While the motor control scheme selection can be performed by repeated calculation of a torque capacity threshold on a real time basis, calculations of voltage for various combinations of torque request and motor speed can be made in advance and linked with the appropriate motor control scheme in the lookup table.

Figure 4:
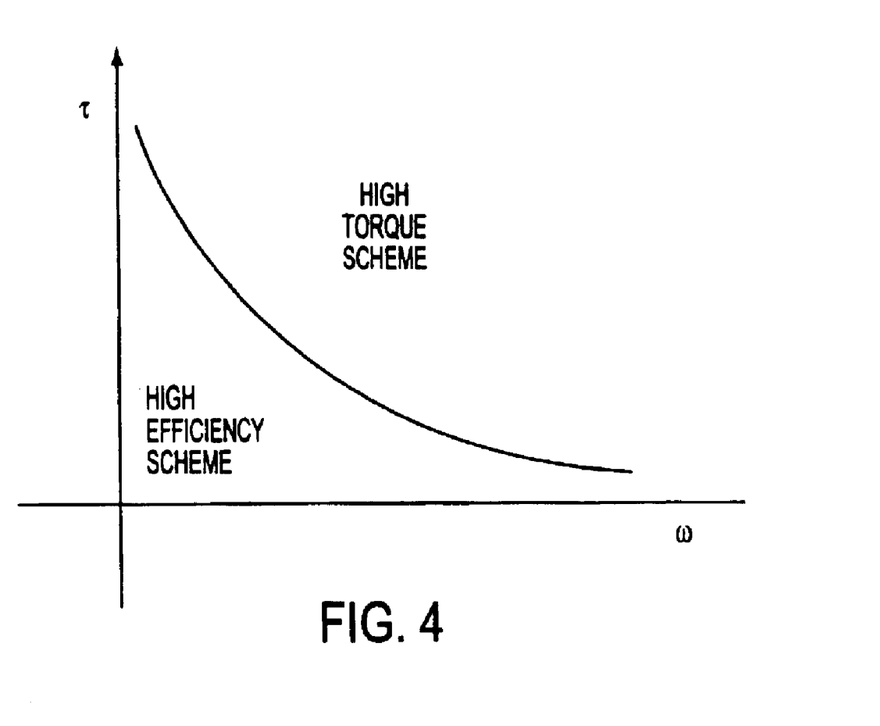
FIG. 4 is a curve representing motor control scheme selection for ranges of torque and speed in accordance with the present invention.

For example, FIG. 4 shows a curve that represents a boundary in such a lookup table between ranges for high-efficiency motor control scheme selection and high-torque motor control scheme selection. With the abscissa of the graph in FIG. 4 representing actual speed and the ordinate representing requested torque, the curve is asymptotic to both axes with speed/torque combinations above the curve being beyond the capacity of the system to obtain torque in the high efficiency profile operational mode.

For each combination of torque command $\tau_d$ and actual speed ω corresponding to the high-efficiency motor control scheme with current of sinusoidal waveform trajectory, the look-up table in the phase advance and profile memory 48 stores per-phase optimal phase advance angle $\alpha_{opti}$ and per-phase optimal phase current amplitude $I_{opti}$ determined to maximize torque value for actual speed of the vehicle, and to minimize motor phase current for the actual speed of the vehicle and torque required to achieve the desired speed.

Hence, the controller 44 at step 96 interacts with the look-up table in the phase advance and profile memory 48 to determine a control strategy appropriate for current driving conditions. For example, the controller 44 may determine whether phase advance angle $\alpha_{opti}$ stored in the look-up table for a particular combination of torque command $\tau_d$ and actual speed ω is valid, i.e. whether the phase advance angle is not less than zero (step 98). If the controller 44 determines that for the current combination of torque command $\tau_d$ and actual speed ω, the look-up table stores a valid phase advance angle $\alpha_{opti}$, a high-efficiency motor control scheme with the respective phase advance angle $\alpha_{opti}$ is selected (step 100).

The selection of high-efficiency motor control scheme results in energizing the phase windings with current of sinusoidal waveform for high efficiency operation.

The sinusoidal wave current trajectory $I_{sin}(t)$ of the desired phase current $I_{di}(t)$ supplied to the controller 44 is generated from the following equation:

$$I_{sin}(t) = I_{opti} \sin(N_r \theta_i + \alpha_{opti}).$$

Application of the phase advance angle optimized to maximize torque needed to achieve a desired speed enables the cruise control system of the present invention to extend a range of operation at the high-efficiency control scheme beyond limits available without phase advance angle adjustment. As a result, the cruise control system of the present invention provides precision control of the motor to minimize power consumption while achieving torque required to maintain the desired speed.

If no valid phase advance angle is found in the look-up table for the current combination of torque command $\tau_d$ and actual speed ω, the controller 44 selects a high-torque motor control scheme to obtain a square wave current waveform trajectory $I_{sq}(t)$ of the desired phase current $I_{di}(t)$ supplied to the controller 44 (step 102). The square wave current waveform trajectory $I_{sq}(t)$ may be obtained using the following expression:

$$I_{sq} = I_{rn} sgn(\sin(N_r \theta_i))$$

where sgn (x) denotes the standard signum function and is defined as 1 if x>0, 0 if x=0, and −1 if x<0. The square wave current waveform $I_{sq}(t)$ may have a trapezoidal shape with configurable rising and falling edges.

Based on selected motor control scheme with respective waveform profile of the desired phase current $I_{di}(t)$, the controller 44 of the cruise control system generates the following control voltage:

$$V_i(t)=L_i dI_{di}/dt+R_i I_i+E_i+k_{si}e_i$$

utilizing the torque command value and the signals received from phase current sensors, position sensor and speed detector (step 104). The computations of $V_i(t)$ may be performed successively for each phase in real time.

The look-up table in the phase advance and profile memory 48 may store the term $L_i dI_{di}/dt$, as well as the back-EMF value $E_i$ used in the calculation of the voltage $V_i(t)$. The value $E_i$ may be selected from the lookup table based on a combination of speed and rotor position.

Then, the controller 44 successively outputs calculated control signals $V_i(t)$ for each phase to the power block 42 for individual energization of respective phase windings in a sequence established in the controller 44 (step 106). Each successive control signal $V_i(t)$ is related to the particular current sensed in the corresponding phase winding, the immediately sensed rotor position and speed, and also to model parameters, $K_{ei}$ and $K_{\tau i}$, that have been predetermined specifically for the respective phases.

In this disclosure there is shown and described only preferred embodiments of the invention and a few examples of its versatility. It is to be understood that the invention is capable of use in various other combinations and environments and is capable of changes or modifications within the scope of the inventive concept as expressed herein. As can be appreciated, the cruise control system with precision motor control of the present invention can be utilized in a wide range of applications in addition to vehicles.

Further, various other motor control schemes defining different current waveform profiles may be utilized. The profile memory thus may store a plurality of motor control scheme data sets accessible by the controller in response to receipt of specific motor control scheme selection commands. Various lookup tables of varying complexities can be formulated for appropriate profile mode selection by the controller.

What is claimed is:

1. A system for controlling a multiple phase electric machine, said system comprising:
   a machine speed device for producing a desired machine speed signal indicating a desired speed;
   a means for measuring the actual machine speed and generating a machine speed signal;
   a control signal generating circuit for producing a control signal to energize the electric machine, the control signal being formed based on control current required to achieve the desired speed, and
   a phase advance angle adjustment circuit for controlling a phase advance angle between the control current and back-EMF to produce the control current sufficient to achieve the desired speed.

2. The system of claim 1, further comprising waveform profile selection circuit for adaptively modifying waveform profile of the control current if the control current with the phase advance angle is not sufficient to achieve the desired speed.

3. The system of claim 1, wherein the machine is a multiphase permanent magnet motor having a stator with a plurality of phase windings.

4. The system of claim 3, wherein the control signal is produced to energize a phase winding of the motor.

5. The system of claim 4, wherein the phase advance angle adjustment circuit sets the phase advance angle for each phase of the motor.

6. The system of claim 1, wherein the phase advance angle is set to obtain a maximum torque value for actual speed of a vehicle.

7. The system of claim 6, wherein the phase advance angle is set to minimize motor phase current for the actual speed of the vehicle and torque required to achieve the desired speed.

8. The system of claim 2, wherein a waveform profile of the control current with the phase advance angle has a substantially sinusoidal shape.

9. The system of claim 8, wherein the substantially sinusoidal waveform profile is modified into a substantially rectangular waveform profile when the control current having substantially sinusoidal waveform profile is not sufficient to achieve the desired speed.

10. The system of claim 1, wherein the phase advance angle adjustment circuit comprises a look-up table responsive to actual speed of the vehicle and torque required to achieve the desired speed, for outputting the control current with the adjusted phase angle.

11. The system of claim 10, wherein the look-up table is configured to output the control current with the modified waveform profile, if the current with the adjusted phase angle is not sufficient to achieve the desired speed.

12. The system of claim 3, wherein the motor stator comprises a plurality of ferromagnetically autonomous electromagnets, each electromagnet having wound thereon one of the phase windings.

13. The system of claim 12, wherein the control signal generating circuit produces control voltage to successively energize each phase winding of the motor.

14. A method of controlling a multiple phase electric machine, said method comprising the steps of:
    producing a control signal to energize the machine the control signal being formed based on control current required to achieve a desired speed, and
    controlling a phase advance angle between the control current and back-EMF to produce the control current sufficient to achieve the desired speed.

15. The method of claim 14, further comprising the step of adaptively modifying waveform profile of the control current if the control current with the phase advance angle is not sufficient to achieve the desired speed.

16. The method of claim 14, wherein the machine is a multiphase permanent magnet motor having a stator with a plurality of phase windings.

17. The method of claim 16, wherein the control signal is provided to successively energize each phase winding of the motor.

18. The method of claim 17, wherein the phase advance angle is adjusted for each phase of the motor.

19. The method of claim 14, wherein the phase advance angle is adjusted to obtain a maximum torque value for actual speed of a vehicle.

20. The method of claim 19, wherein the phase advance angle is adjusted to minimize phase current for the actual speed of the vehicle and torque required to achieve the desired speed.

21. The method of claim 15, wherein a waveform profile of the control current with the phase advance angle has a substantially sinusoidal waveshape.

22. The method of claim 21, wherein the substantially sinusoidal waveform profile is modified into a substantially rectangular waveform profile when the control current having substantially sinusoidal waveform profile is not sufficient to achieve the desired speed.

23. A control system for an electric machine comprising:
a multiple phase electric machine;
a machine speed device to generate a desired machine speed signal;
a means for measuring the actual machine speed and generating a machine speed signal;
a means for measuring one or more machine operating conditions and generating a machine operating condition signal;
a means to store or calculate one or more electric current shapes and current parameter types for a desired machine speed and motor operating condition; and
a control system wherein said system receives a requested machine speed signal and an actual machine speed signal and machine operating condition signal, wherein said control system generates a control signal to each electric phase of the machine to determine the amount of electric current flow to each electric phase the current shape and current parameter.

24. The system of claim 23, wherein the control signal is a current phase advance angle adjustment.

25. The system of claim 24, wherein the phase advance angle adjustment is calculated to obtain a maximum machine torque value for the actual machine speed.

26. A method of controlling a multiple phase electric machine, said method comprising the steps of:
providing a multiple phase electric machine comprising a machine speed input device that generates a desired machine speed signal;
wherein said system has a means for measuring the actual machine speed and generating a machine speed signal;
said system has a means for measuring one or more machine operating conditions and generating a machine operating condition signal;
said system has a means to store or calculate one or more electric current shapes and current parameter types for a machine operating condition; and
said control system receives the desired machine speed signal and the actual machine speed signal and machine operating condition signal wherein said control system generates a control signal to control the amount of electric current flow, current shape, and current parameter.

27. The method of claim 26, wherein the control signal generates a current phase advance angle adjustment is adjusted for each electric phase of the motor.

28. The method of claim 27, wherein the phase advance angle is adjusted to obtain a maximum machine torque value for actual machine speed.

* * * * *